(12) United States Patent
Uno et al.

(10) Patent No.: US 6,330,804 B1
(45) Date of Patent: Dec. 18, 2001

(54) REFRIGERATING UNIT

(75) Inventors: Masaki Uno; Naoki Hattori, both of Shimizu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/511,157

(22) Filed: Feb. 23, 2000

(30) Foreign Application Priority Data

Mar. 10, 1999 (JP) .................................................. 11-062718

(51) Int. Cl.⁷ ...................................................... F25B 1/10
(52) U.S. Cl. .............................. 62/175; 62/228.4; 62/510
(58) Field of Search ............................ 236/1 EA; 62/175, 62/228.4, 510

(56) References Cited

U.S. PATENT DOCUMENTS

| | | | |
|---|---|---|---|
| 3,905,202 | * | 9/1975 | Taft et al. ................................ 62/510 |
| 3,948,060 | * | 4/1976 | Gaspard ................................. 62/175 |
| 4,614,089 | * | 9/1986 | Dorsey ................................. 236/1 EA |
| 4,951,475 | * | 8/1990 | Alsenz ................................. 62/175 |
| 5,131,237 | * | 7/1992 | Valbjorn ................................. 62/175 |
| 5,797,729 | * | 8/1998 | Rafuse, Jr. et al. ................... 62/126 |

FOREIGN PATENT DOCUMENTS

| | | |
|---|---|---|
| 7259773 | 10/1995 | (JP) . |
| A-09-273819 | 10/1997 | (JP) . |

* cited by examiner

*Primary Examiner*—William E. Tapolcai
(74) *Attorney, Agent, or Firm*—Antonelli, Terry, Stout & Kraus, LLP

(57) ABSTRACT

A refrigerating unit capable of optimum operation with respect to load by finely changing the operating capacity in response to changes in load, and offering energy saving effects. The refrigerating unit has a scroll type inverter-driven compressor and scroll type constant-speed compressors; a pressure sensor installed on the suction side; a circuit for starting the inverter-driven compressor first; and a circuit for deciding the driving frequency of the compressor and the number of constant-speed compressors to operate, based on a suction pressure value detected by the pressure sensor after the compressor was started.

13 Claims, 6 Drawing Sheets

REFRIGERATING UNIT

BACKGROUND OF THE INVENTION

The present invention relates to a refrigerating unit which has a plurality of compressors installed in parallel and controls the operation capacity according to the load to be refrigerated, and this refrigerating unit is most suitable to a configuration that includes an inverter-driven compressor and constant-speed compressors.

In refrigerating units incorporating an inverter-driven compressor and constant-speed compressors, it has been known to additionally put the constant-speed compressor into operation and reduce the driving frequency of the inverter-driven compressor when the driving frequency of the inverter-driven compressor has reached the maximum value and the load further increases. In conjunction with this, a method worthy to note here has been disclosed in JP-A-09-273819, in which when switching over the operation from the inverter-driven compressor to the constant-speed compressor, the inverter-driven compressor is brought to a halt for a fixed period of time to decrease the operation time of the inverter-driven compressor to thereby improve the reliability of the inverter-driven compressor.

Since in the prior art mentioned above the driving frequency of the inverter-driven compressor is lowered or the inverter-driven compressor is stopped from operating for a fixed period in response to changes in load, it has been difficult to finely control the operation capacity in response to varying load, and there has been a possibility that the load capacity and the operation capacity become unmatched.

The object of the present invention is to make it possible to finely vary the operation capacity in response to changes in load, enable optimum operation according to load, and thereby achieve a reduction in energy consumption.

SUMMARY OF THE INVENTION

According to an aspect of the present invention made to achieve the above object, in a refrigerating unit having an inverter-driven compressor using a variable driving frequency, and constant-speed compressors using a constant driving frequency, the refrigerating unit comprising a pressure sensor installed on the suction side of the inverter-driven compressor and constant-speed compressors, means for starting the inverter-driven compressor first, and means for deciding a driving frequency for the inverter-driven compressor or deciding the number of compressors to operate, based on a suction pressure value detected by the pressure sensor after the inverter-driven compressor is started.

Because the operation of the inverter-driven compressor is started first, it is possible to obtain a smooth starting of the operation of the refrigerating unit in accordance with load when the unit is started. After this, the driving frequency of the inverter-driven compressor or the number of compressors to operate is decided based on the suction pressure value of the compressors. Therefore, even if there is a great change in refrigerating load, a sufficient capacity can be secured in accordance with this great change of load, and the capacity can be finely controlled. Thus, it is possible to perform the operation with optimum operation capacity with respect to load and thereby reduce energy consumption.

In the above operation, when the suction pressure value rises above a specified value, it is desirable to start one or more constant-speed compressors regardless of the driving frequency of the inverter-driven compressor.

Further in the above operation, when the suction pressure value falls below a specified value, it is desirable to stop the constant-speed compressors regardless of the driving frequency of the inverter-driven compressor.

Further in the above operation, it is desirable to start the constant-speed compressors one by one after the driving frequency of the inverter-driven compressor has reached the maximum value.

Further in the above operation, it is desirable to stop the constant-speed compressors one by one after the driving frequency of the inverter-driven compressor has reached the minimum value.

Further in the above operation, it is desirable to decide the maximum and minimum values of the driving frequency of the inverter-driven compressor, start the constant-speed compressors one by one after the maximum frequency has been reached, and stop the constant-speed compressors one by one after the minimum frequency has been reached.

According to another aspect of the present invention, in a refrigerating unit having an inverter-driven compressor using a variable driving frequency, and constant-speed compressors using a constant driving frequency, the refrigerating unit comprising an inverter-driven compressor of scroll type and constant-speed compressors of scroll type, and a pressure sensor installed on the suction side of the inverter-driven compressor and constant-speed compressors, and when a value detected by the pressure sensor at the start of the operation is greater than a preset value, an inverter-driven compressor and a constant-speed compressor are started, and thereafter the driving frequency of the inverter-driven compressor and the number of constant-speed compressors to operate are decided.

Because the inverter-driven compressor and a constant-speed compressors are started when the suction pressure value of the compressors is greater than a preset value at the start of the operation, a sufficient operation capacity relative to load can be secured at the start of the operation, and even if there is a sudden increase in load, a smooth starting can be obtained in response to this sudden load increase.

Thereafter, the driving frequency of the inverter-driven compressor and the number of constant-speed compressors to operate are decided based on a suction pressure value of the compressors. In consequence, a sufficient capacity can be secured according to load and fine control of capacity can be realized.

According to a further aspect of the present invention, in a refrigerating unit having an inverter-driven compressor using a variable driving frequency, and constant-speed compressors using a constant driving frequency, the refrigerating unit comprising an inverter-driven compressor of scroll type and constant-speed compressors of scroll type, and a pressure sensor installed on the suction side of the inverter-driven compressor and constant-speed compressors, and the driving frequency of the inverter-driven compressor and the number of constant-speed compressors to operate are decided based on a suction pressure value detected by the pressure sensor, and the capacity can be controlled in a wide range of 15% to 100%.

Because the driving frequency of the inverter-driven compressor and the number of constant-speed compressors to operate are decided based on a suction pressure value and the capacity control range is from 15% to 100%, an optimum operation capacity with respect to conceivable load of an air conditioner can be obtained, which makes it possible to achieve a reduction in energy consumption.

According to an additional aspect of the present invention, in a refrigerating unit having an inverter-driven compressor using a variable driving frequency, and constant-speed compressors using a constant driving frequency, the refrigerating unit comprising an inverter-driven compressor of scroll type and constant-speed compressors of scroll type, a pressure sensor installed on the suction side of the inverter-driven compressor and constant-speed compressors, means for deciding a driving frequency of the inverter-driven compressor and the number of the constant-speed compressors to operate, based on a suction pressure value detected by the pressure sensor, and means for determining a failure of the inverter for driving the inverter-driven compressor, and when the inverter is determined to be out of order by the failure-determining means, capacity control is continued by changing the number of compressors to operate, including the inverter-driven compressor and the constant-speed compressors.

Even when the inverter is faulty, the capacity control is continued by changing the number of compressors to operate, including the inverter-driven compressor and the constant-speed compressors. Thus stepwise capacity control can be continued even if frequency control is not performed.

According to yet another aspect of the present invention, in a refrigerating unit having an inverter-driven compressor using a variable driving frequency and constant-speed compressors using a constant driving frequency, the refrigerating unit comprising an inverter-driven compressor of scroll type and constant-speed compressors of scroll type, a pressure sensor installed on the suction side of the inverter-driven compressor and constant-speed compressors, means for starting the operation of the inverter-driven compressor first when a suction pressure value (Ps) detected by the pressure sensor is greater than a preset value (PsU), means for decreasing the driving frequency of the inverter-driven compressor according to a difference between the suction pressure value (Ps) and the preset value (PsU) when the suction pressure value has risen above a specified value (C) after the inverter-driven compressor is started, and means for starting a constant-speed compressor after the driving frequency is decreased.

Because the operation of an inverter-driven compressor is started first when the suction pressure value (Ps) is greater than a preset value and the driving frequency of the inverter-driven compressor is decreased according to a difference between the suction pressure value (Ps) and a preset value (PsU) when the suction pressure value has risen above a specified value (C) and a constant-speed compressor is started when the driving frequency has been decreased, a change in the operation capacity can be made small even if the number of compressors operated is changed and therefore a sufficient capacity can be secured with respect to changes in load and even finer capacity control can be implemented.

DESCRIPTION OF EMBODIMENT

An embodiment of the present invention will be described with reference to the accompanying drawings.

Figure 1:
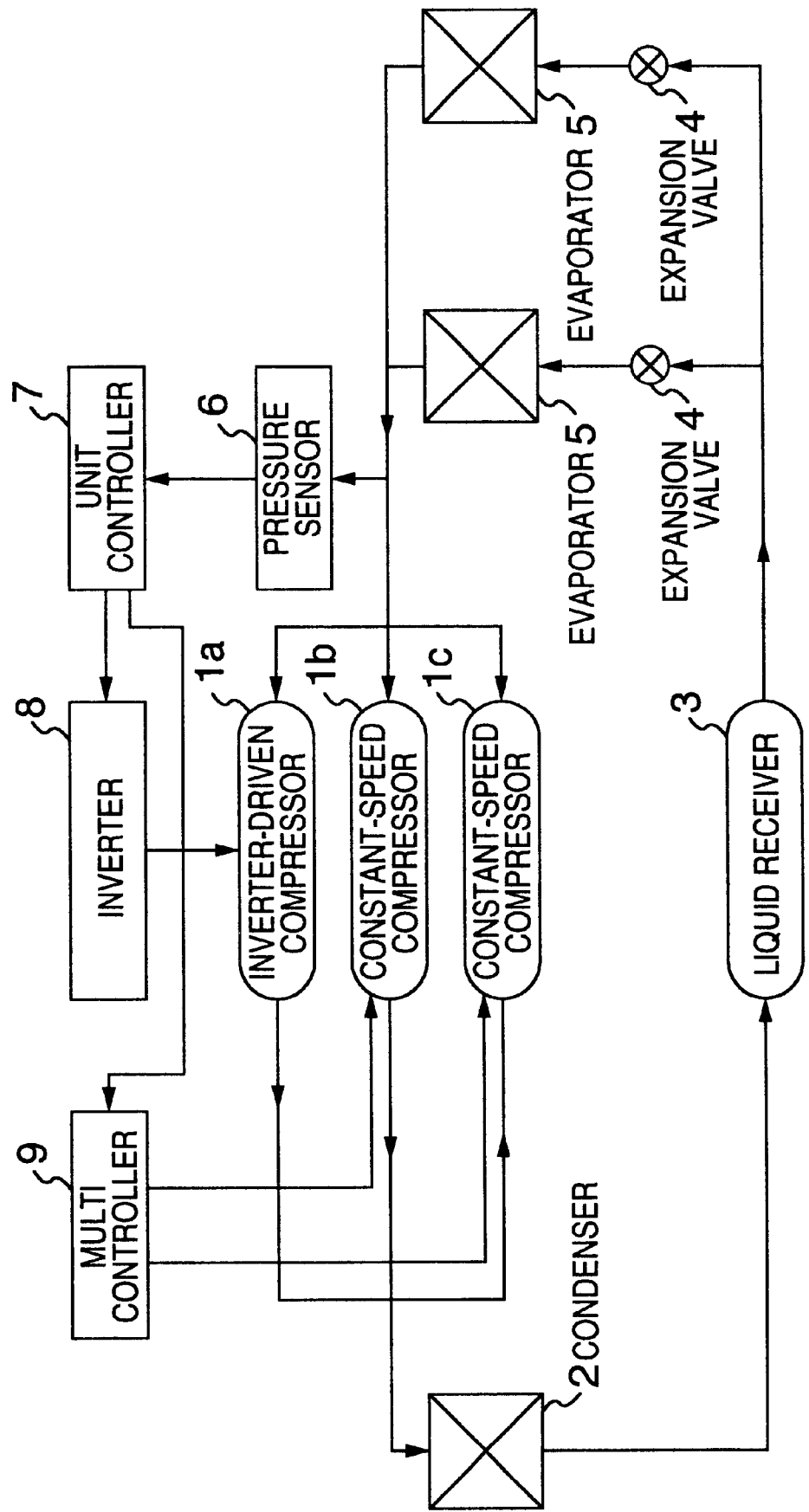
FIG. 1 is a refrigerating cycle flow diagram of a refrigerating unit according to an embodiment of the present invention.

FIG. 1 is a diagram showing an example of a basic refrigerating cycle of a refrigerating unit according to an embodiment of the present invention. In FIGS. 1, 1a, 1b and 1c denote scroll compressors, in which 1a denotes an inverter-driven compressor, and 1b and 1c denote constant-speed compressors. A refrigerating cycle is formed by those compressors and other main devices, such as a condenser 2, a liquid receiver 3, an expansion valve 4, and an evaporator 5. A pressure sensor 6 is mounted on a pipe on the suction side of the compressors, and a suction pressure value detected by the pressure sensor 6 is processed by a unit controller 7 to decide the then operation capacity.

The unit controller 7 controls revolution speed and the number of scroll compressors to operate by outputting to an inverter 8 an operating frequency command for the compressor 1a and outputting to a multi controller 9 an operation command for the constant-speed compressors 1b and 1c, to thereby obtain an optimum operation capacity to suit the then load capacity.

Referring to FIGS. 2 to 6, description will be made of a method for controlling the capacity of the scroll compressors 1a, 1b and 1c.

Figure 2:
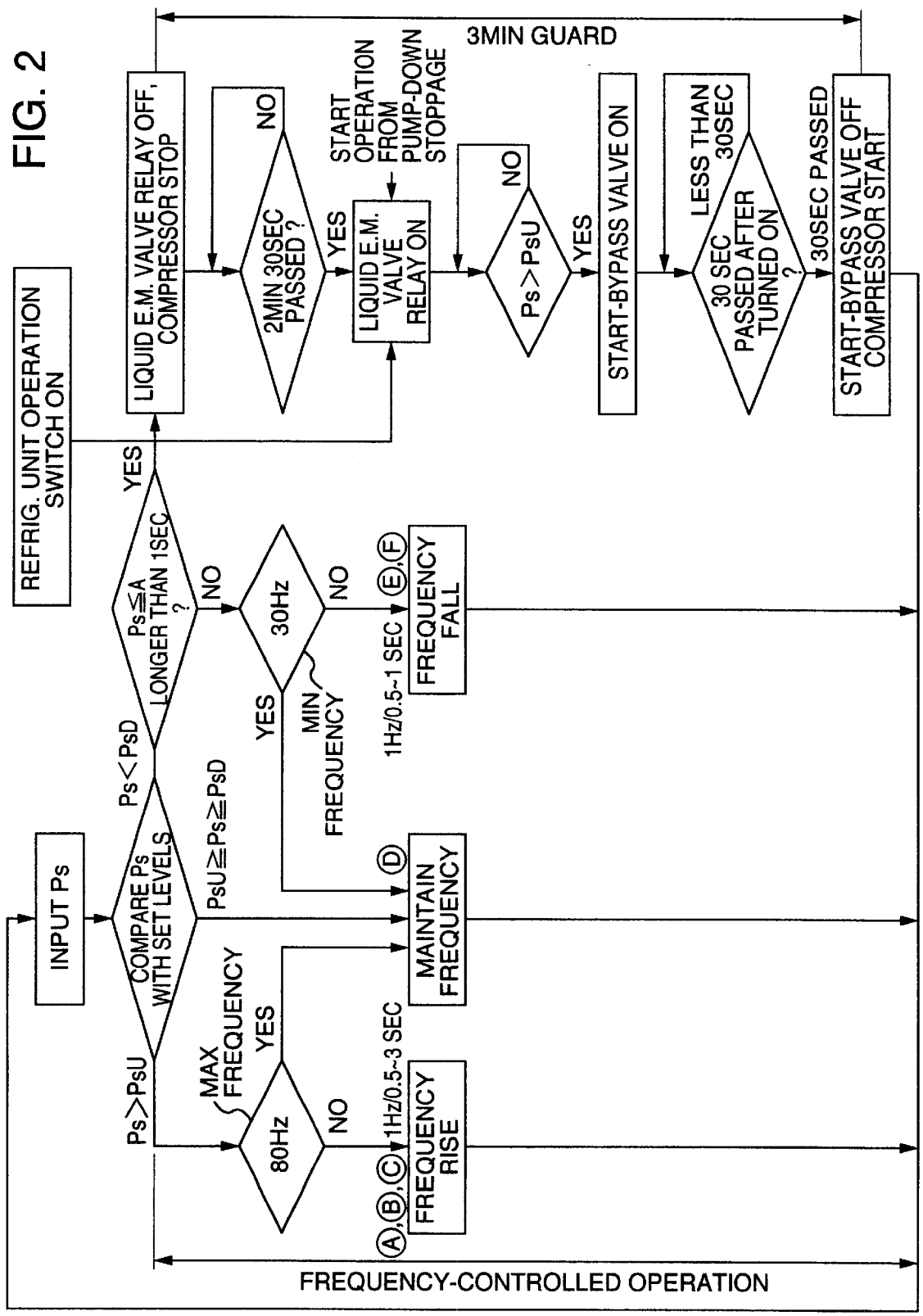
FIG. 2 is an operation flow chart in an inverter-driven compressor of the refrigerating unit according to the embodiment of the present invention.

FIG. 2 is an operation flow chart of the refrigerating unit according to an embodiment of the present invention, chiefly dealing with an inverter-driven compressor controlled by the inverter 8. FIGS. 3A, 3B, 4 and 5A–5C are operation flow charts of the constant-speed compressors 1b and 1c controlled by the multi controller 9. FIG. 4 shows a relation between symbols A to F in FIGS. 2, 3A, 3B, 4 and 5A–5C and suction pressures, and indicates the operation control zones of the compressors 1a, 1b and 1c.

Description will start with the operation flow chart of the compressor 1a controlled by the inverter 8.

Figure 6:
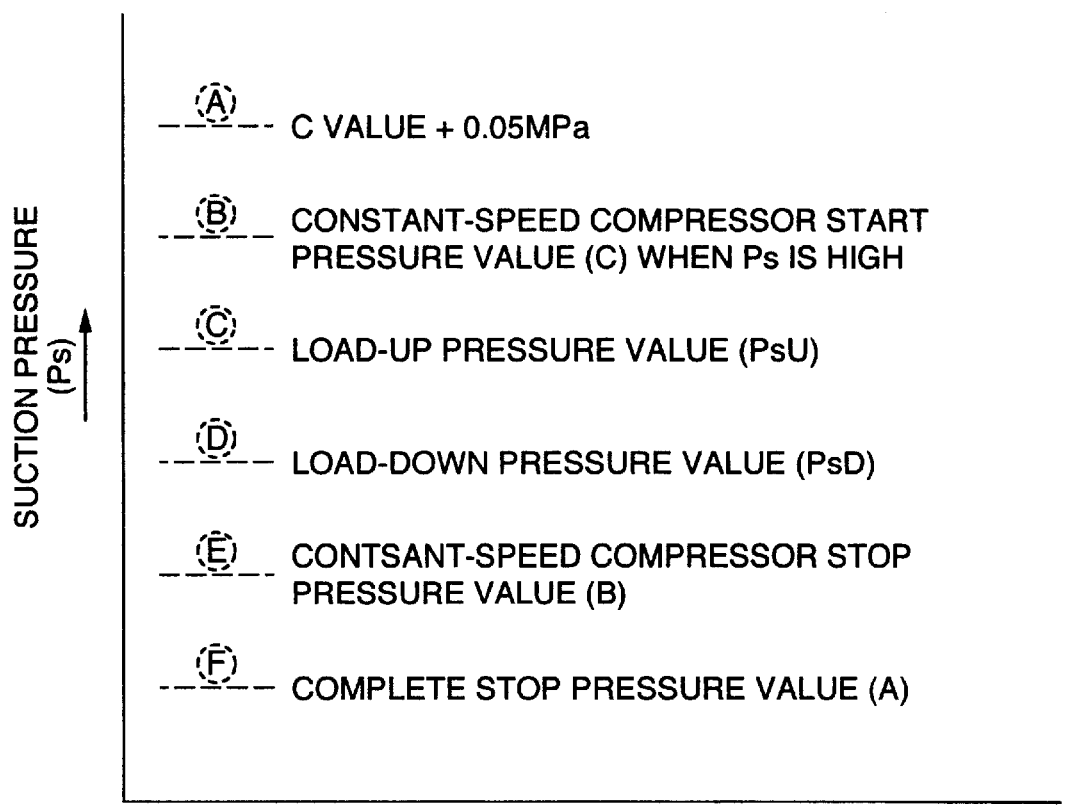
FIG. 6 is a graph showing operation control zones of a compressor in the refrigerating unit according to the embodiment of the present invention.

Before starting the compressor, if the suction pressure Ps detected by the pressure sensor 6 is greater than a preset start condition value PsU of the compressor 1a, in other words, if the suction pressure Ps is in a zone from A to C in FIG. 6, the unit controller 7 outputs an operation command to the inverter 8 to start the operation of the compressor 1a. As for the operating frequency at startup, the compressor 1a is started at a lower limit frequency of 30 Hz, for example, of the preset operating frequency range.

After this, when Ps is detected by the pressure sensor 6 and Ps is higher than PsU, that is to say, when the load is greater than the operation capacity, the unit controller 7 issues an operating frequency command to the inverter 8 to increase the operating frequency. Note that the upper limit of the operating frequency is to be the upper-limit frequency of the preset operating frequency range, 80 Hz for example.

Next, the inverter 8 controls the scroll compressor 1a to increase its revolution speed at a frequency specified by the unit controller 7.

If Ps is less than PsD, that is to say, if Ps is in a zone E to F in FIG. 6, because this means that load is smaller than the operation capacity, the operating frequency is decreased. The lower limit of the operating frequency is to be the lower-limit frequency of 30 Hz of the preset operating frequency range. If the operating frequency becomes equal to or less than A, namely, Ps×A during operation, the compressor 1a is stopped.

If Ps is in a range of PsD≦Ps≦PsU, in other words, if Ps in zone D in FIG. 6, this means that the operating frequency is at optimum, the operating frequency at the moment is maintained.

The operation flow chart of the constant-speed compressors 1b and 1c controlled by the multi controller 9 will be described with reference to FIGS. 3A, 3B, 4 and 5A to 5C. First, a starting control of the constant-speed compressors while the compressor 1a is in operation will be explained with reference to FIG. 3A. If Ps is in a range of PsU<Ps<C, namely, in zone C in FIG. 6 and after the operating frequency of the compressor 1a has reached the maximum frequency, the inverter-driven compressor 1a has continued operating at the maximum frequency for longer than a preset time (capacity-up detection time), then a decision is made that load is heavy and one constant-speed compressor, either 1b or 1c, is put into operation to increase the operation capacity.

If the same condition still continues, another constant-speed compressor is put into operation. Even if the operating frequency is not at its maximum, if there is a sudden increase in load relative to the current operation capacity and Ps is higher than the value C, namely, in the zone A or B in FIG. 6, one constant-speed compressor is put into operation regardless of the operating frequency. In this way, it is possible to secure a follow-up characteristic to respond to a sudden change in load.

Next, a stopping control of the constant-speed compressors while the compressor 1a and the constant-speed compressors 1b and 1c are in operation, will be explained with reference to FIG. 4. If Ps<PsD, that is to say, if the state of the zone E in FIG. 6 continues for a specified period of time, five minutes or longer for example, then a decision is made that the load is small and one of the constant-speed compressors 1b and 1c is stopped to decrease the operation capacity. If the same state continues further, another constant-speed compressor is stopped, leaving only the compressor 1a to operate. Even if the state of Ps<PsD does not continue for five minutes or longer, when the load decreases suddenly relative to the current operation capacity and Ps falls to the value B or less, in other words, to the zone F in FIG. 6, one constant-speed compressor is stopped. In this way, like in the capacity-up operation mentioned above, a follow-up characteristic in response to an abrupt change in load can be secured.

Figures 3A, 3B:
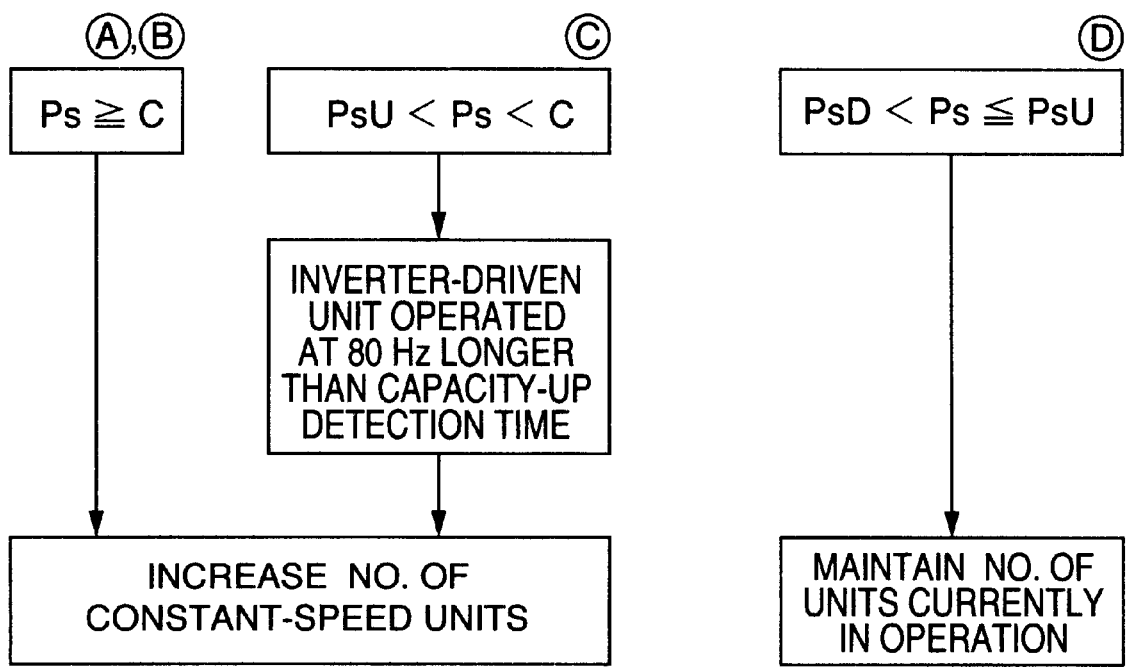
FIGS. 3A and 3B are operation flow charts in a constant-speed compressor of the refrigerating unit according to the embodiment of the present invention.
Figure 4:
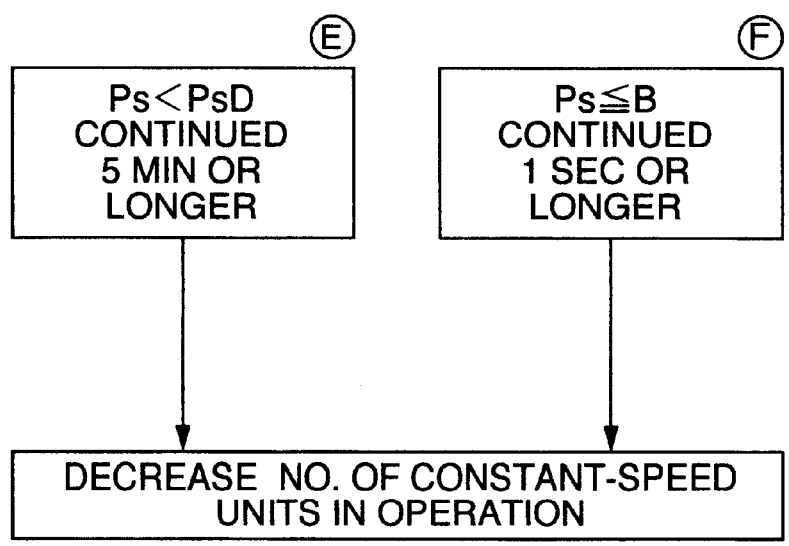
FIG. 4 is an operation flow chart in the constant-speed compressor of the refrigerating unit according to the embodiment of the present invention.

When Ps is in a range of PsD≦Ps≦PsU as shown in FIG. 3B, an optimum operating capacity is being obtained and the number of the compressors currently in operation may be maintained.

Figure 5A:
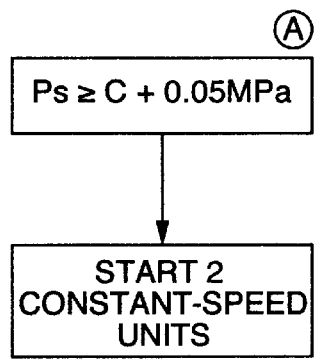
FIGS. 5A, 5B and 5C are operation flow charts in the constant-speed compressor of the refrigerating unit according to the embodiment of the present invention.

After all compressors were stopped, if there is a large load before startup and Ps≧C+0.05 MPa, more specifically, if Ps is in the zone B in FIG. 6, all the compressors 1a, 1b and 1c are started together at the same time, as shown in FIG. 5A.

Figure 5B:
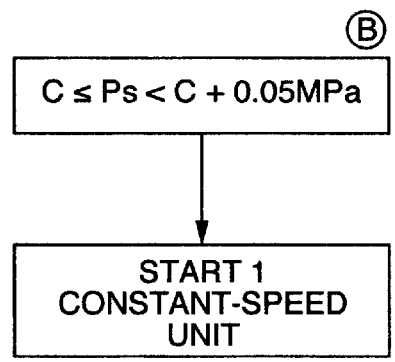

When C≦Ps<C+0.05 MPa, that is, when Ps is in the zone B in FIG. 6, two compressors, more specifically, the compressor 1a and the constant-speed compressor 1b or 1c are started at the same time, as shown in FIG. 5B.

Figure 5C:
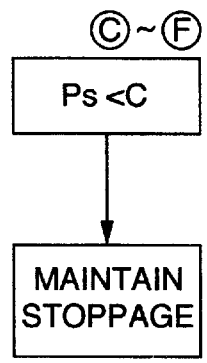

When PsU<Ps<C, that is, when Ps is in the zone C in FIG. 6, stoppage of the constant-speed compressors is maintained and only the compressor 1a is started, as shown in FIG. 5C. Arranged in this manner, even at compressor startup immediately after Ps has risen following stoppage of the refrigerating cycle for an extended time for defrosting, for example, an improved follow-up characteristic with respect to load can be obtained. It ought to be noted, however, that if two compressors are started practically simultaneously, a starting current increases to a large amount and therefore it is desirable to start the compressors one by one with a time lag of five seconds there between.

Figure 8:
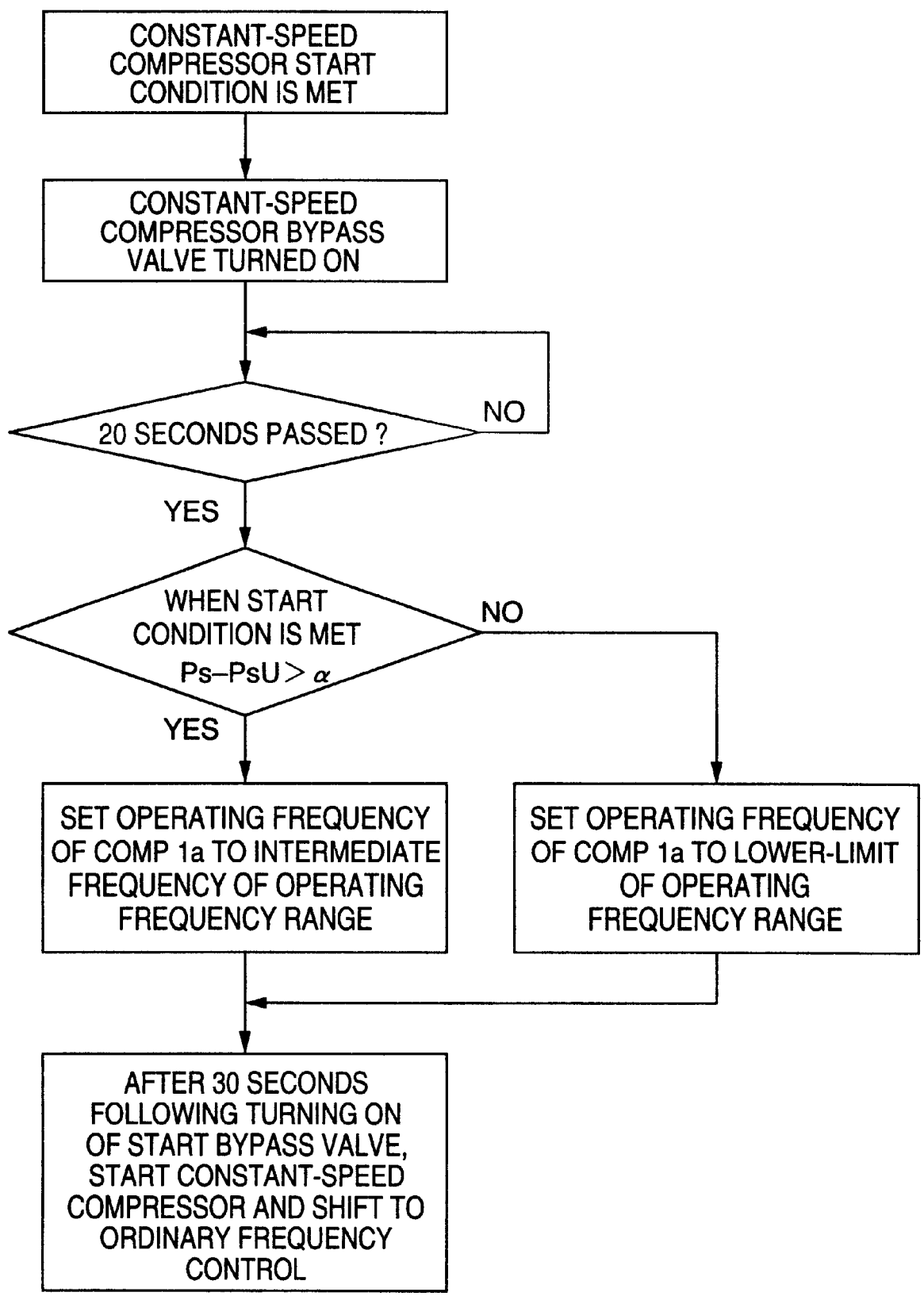
FIG. 8 is an operation flow chart of the constant-speed compressor according to the embodiment of the present invention.

Referring to the flow chart in FIG. 8, description will be made of control of decreasing the operating frequency temporarily before starting the constant-speed compressor 1b or 1c.

When the operating frequency of the compressor 1a controlled by the inverter 8 has reached a maximum value and thus the condition for starting the constant-speed compressor 1b or 1c is met, a start-bypass valve is turned ON to start the constant-speed compressor. After passage of 20 seconds following turning ON of the bypass valve, the operating frequency of the compressor 1a is decreased to a preset operating frequency.

How much the frequency is to be decreased is decided by a difference between Ps and PsU when the condition for starting the constant-speed compressor is established. More specifically, when the difference between Ps and PsU is smaller than a preset value α, the operating frequency is decreased to the lower-limit of the frequency control range is used to minimize the change of the operation capacity to thereby reduce energy consumption. When the difference between Ps and PsU is larger than the preset value α, the operating frequency is set to an intermediate frequency of the operation control range to secure a follow-up characteristic with respect to load. After this, the start bypass is turned OFF and the constant-speed compressor is started to shift to ordinary control. With the arrangement described, even if the number of compressors to operate is changed, there is not a large change in the operation capacity, in other words, a fine capacity control is made possible.

Figure 7:
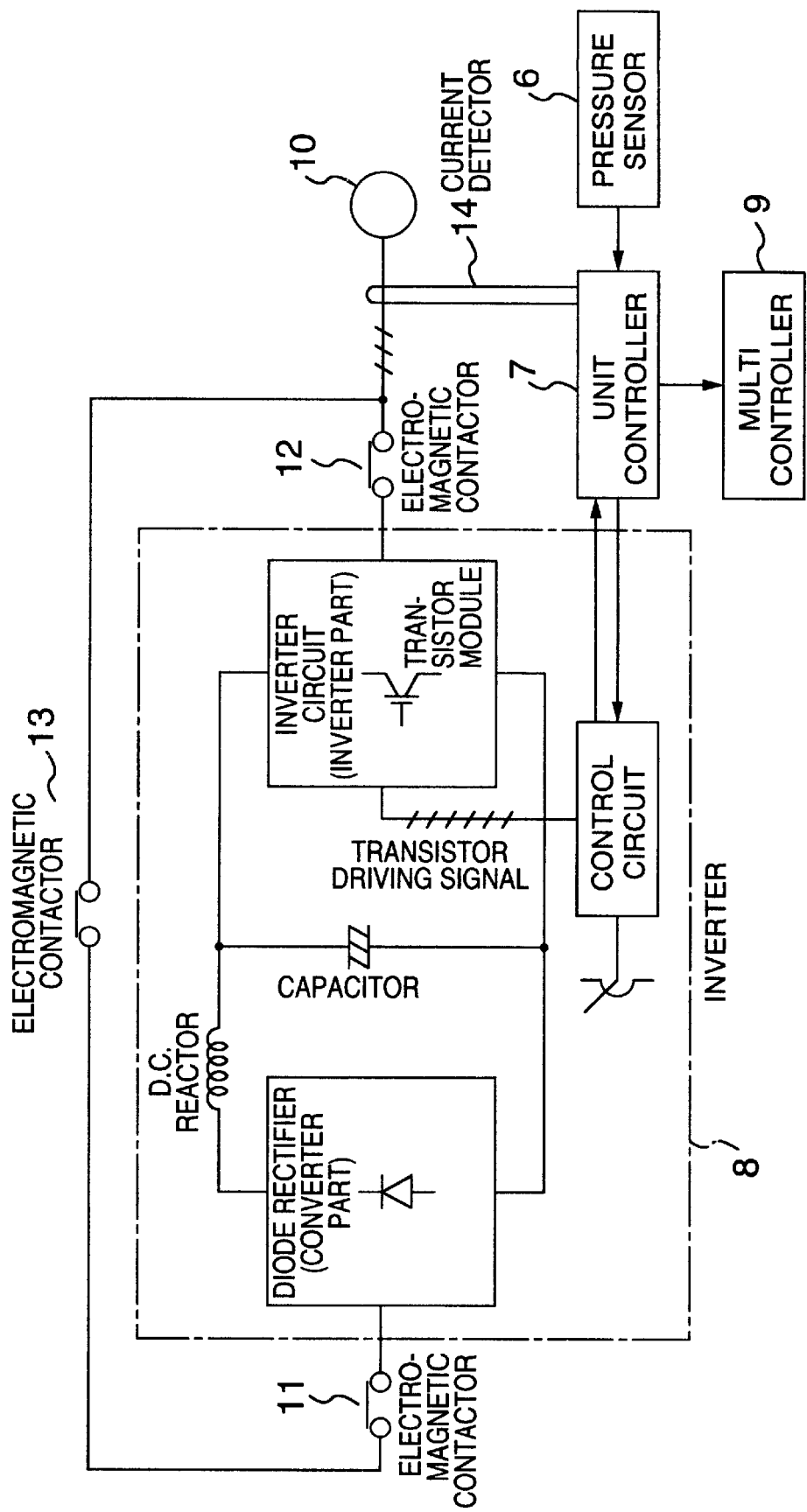
FIG. 7 is a block diagram according to the embodiment of the present invention.

Referring to FIG. 7, operation when the inverter is out of order will be described.

When the inverter 8 is normal, electromagnetic contactors 11 and 12 are closed to conduct electric power to an electric motor 10 for the scroll compressor 1a. When any abnormality is detected, such as an abnormal rise in temperature of the inverter 8, the inverter 8 issues an abnormality signal to the unit controller 7. Further, a current detector 14 is provided on the secondary side of the inverter 8 to defect currents of the motor and in cases such as when the unit controller 7 is sending an operation command to the inverter 8 but the current detector 14 detects no current, a decision is made that this is a failure.

If a decision is made that there is abnormality or a failure, the electromagnetic contactors 11 and 12 are opened and an electromagnetic contactor 13 is closed to conduct commercial power directly to the motor 10 for the scroll compressor 1a.

The operating conditions for the scroll compressor 1a are as follows. If Ps>PsU, the operation of the scroll compressor 1a is started, and if Ps≦A, the scroll compressor 1a is stopped. The constant-speed compressors 1b and 1c continue to operate at the same control value as when there is no abnormality. Therefore, frequency control is not performed but stepwise capacity control is possible, so that the compressors continue to operate.

As has been described, with a refrigerating unit that performs capacity control by changing the revolution speed of the scroll compressors and the number of units to operate, it is possible to operate the refrigerating unit to provide a capacity which finely matches with the load, so that reductions in energy consumption can be achieved.

Where there are sudden changes in load, a sufficient follow-up characteristic with respect to varying load can be achieved by turning the constant-speed compressors on and off regardless of the operating frequency of the scroll compressor controlled by the inverter.

According to the embodiments of the present invention, because a scroll type inverter-driven compressor is started first, a smooth starting of operation in accordance with load can be obtained, and thereafter the driving frequency of the inverter-driven compressor and the number of constant-speed compressors to operate are decided based on the suction pressure of the compressors. Therefore, even if load varies to a great degree, a sufficient capacity can be secured in response to it, and fine capacity control can be implemented. Accordingly, it is possible to perform operation such that the operating capacity is optimum with respect to load, and reduce energy consumption.

According to the embodiments of the present invention, when the suction pressure of the compressor is higher than a predetermined value at the start of operation, the inverter-driven compressor and the constant-speed compressors are started. Therefore, a sufficient operating capacity can be secured with respect to load when starting the compressors, and a smooth response can be obtained to respond to a sudden increase in load when it occurs.

Further, according to the embodiments of the present invention, because the driving frequency of the inverter-driven compressor and the number of constant-speed compressors to operate are decided based on a suction pressure value and the capacity control range has been made so wide as 15% to 100%, so that the operating capacity can be made optimum with respect to a conceivable load of an air conditioner, by which energy consumption can be reduced.

Further, according to the embodiments of the present invention, even when the inverter becomes out of order, capacity control is continued by changing the number of compressors in operation, including the inverter-driven compressor and the constant-speed compressors, and even if frequency control is not performed, stepwise capacity control can be carried on.

Further, according to the embodiments of the present invention, because of that when the suction pressure value (Ps) is higher than a preset value (PsU), the inverter-driven compressor is started first and that when the suction pressure value becomes higher than a specified value (C), the driving frequency of the inverter-driven compressor is decreased according to a difference between the suction pressure value (Ps) and the preset value (PsU) and that after the driving frequency has been decreased, the constant-speed compressor is started, even if the number of compressors in operation is changed, changes in operating capacity can be reduced and therefore a sufficient capacity can be secured to be able to respond to changes in load.

What is claimed is:

1. A refrigerating unit having an inverter-driven compressor using a variable driving frequency, and constant-speed compressors using a constant driving frequency, said refrigerating unit comprising:

a pressure sensor installed on the suction side of the inverter-driven compressor and said constant-speed compressors;

means for starting said inverter-driven compressor first, and means for deciding a driving frequency of said inverter-driven compressor or the number of the constant-speed compressors to operate, based on a suction pressure value detected by said pressure sensor after said inverter driven compressor is started, wherein when said suction pressure value rises above a specified value, one or more of said constant-speed compressors is started regardless of the driving frequency of said inverter-driven compressor.

2. A refrigerating unit according to claim 1, wherein when the suction pressure value falls below a specified value, said constant-speed compressors are stopped regardless of the driving frequency of said inverter-driven compressor.

3. A refrigerating unit according to claim 1, wherein said constant-speed compressors are started one by one after the driving frequency of said inverter-driven compressor has reached the maximum value.

4. A refrigerating unit according to claim 1, wherein said constant-speed compressors are stopped one by one after the driving frequency of said inverter-driven compressor has reached the minimum value.

5. A refrigerating unit according to claim 1, wherein the maximum and minimum values of the driving frequency of said inverter-driven compressor are set, and said constant-speed compressors are started one by one after the maximum frequency has been reached, and said constant-speed compressors are stopped one by one after the minimum frequency has been reached.

6. A refrigerating unit according to claim 1, wherein said inverter-driven compressor and said constant-speed compressors are of scroll type, wherein when a value detected by said pressure sensor at starting the compressor is greater than a preset value, said inverter-driven compressor and said constant speed compressors are started, and thereafter the driving frequency of said inverter-driven compressor and the number of constant-speed compressors to operate are decided.

7. A refrigerating unit according to claim 1, wherein said inverter-driven compressor and said constant-speed compressors are of scroll type, wherein the driving frequency of said inverter driven compressor and the number of constant-speed compressors to operate are decided based on a suction pressure value detected by said pressure sensor and the capacity can be controlled in a range of 15% to 100%.

8. A refrigerating unit according to claim 1, wherein said inverter-driven compressor and said constant-speed compressors are of scroll type, said refrigerating unit further comprising:

means for determining a failure of an inverter for driving said inverter-driven compressor, wherein when said inverter is determined to be out of order by said failure-determining means, operating capacity control is continued by changing the number of compressors operating, including said inverter-driven compressor and said constant-speed compressors.

9. A refrigerating unit according to claim 1, wherein said inverter-driven compressor and said constant-speed compressors are of scroll type, said means for starting starts the operation of said inverter-driven compressor when a suction pressure value (Ps) detected by said pressure sensor is greater than a preset value (PsU);

said means for decreasing decreases the driving frequency of said inverter-driven compressor according to a difference between the suction pressure value (Ps) and the preset value (PsU) when the suction pressure value has risen above a specified value (C) after said inverter-driven compressor is started; and said refrigerating unit further comprising means for starting a constant-speed compressor after the driving frequency was decreased.

10. A refrigerating unit, comprising:

an inverter driven compressor having a variable driving frequency;

at least one or more constant speed compressors;

a pressure sensor installed on the common suction side intake of the inverter driven compressor and the at least one constant speed compressor to detect suction pressure; and a controller connected to the inverter driven compressor, the at least one or more constant speed compressors and the pressure sensor, wherein the controller activates the inverter driven compressor first and then the at least one or more constant speed compressors are activated based solely upon the suction pressure being above a predetermined value and said activation of the at least one or more constant speed compressors being completely independent of the driving frequency of the inverter driven compressor.

11. The refrigerating unit recited in claim 10, wherein the controller deactivates the at least one or more constant speed compressors when the suction value falls below a predetermined value, said the activation is completely independent of the driving frequency of the inverter driven compressor.

12. The refrigerating unit recited in claim 10, wherein the controller after activating the at least one or more constant speed compressors determines the driving frequency of the inverter driven compressor to optimize operating capacity of the refrigerating unit.

13. The refrigerating unit recited in claim 10, wherein to the one or more constant speed compressors further comprises:

a first constant speed compressor;

a second constant speed compressor, wherein the controller activates the first constant speed compressor based upon the suction pressure and then activates the second constant speed compressor based upon only suction pressure, the activation of the first constant speed compressor and the suction constant speed compressor are independent of the driving frequency of the inverter driven compressor.

* * * * *